US008514965B2

(12) United States Patent
Christensen et al.

(10) Patent No.: US 8,514,965 B2
(45) Date of Patent: Aug. 20, 2013

(54) WIRELESS COMMUNICATION SYSTEM WITH A MODULATION BANDWIDTH COMPARABLE TO OR EXCEEDING THE BANDWIDTH OF THE TRANSMITTER AND/OR RECEIVER ANTENNAS

(75) Inventors: Kåre Tais Christensen, Smørum (DK); Kehuai Wu, Smørum (DK); Rasmus Glarborg Jensen, Smørum (DK)

(73) Assignee: Oticon A/S, Smorum (DK)

( * ) Notice: Subject to any disclaimer, the term of this patent is extended or adjusted under 35 U.S.C. 154(b) by 234 days.

(21) Appl. No.: 13/043,271

(22) Filed: Mar. 8, 2011

(65) Prior Publication Data

US 2011/0222621 A1 Sep. 15, 2011

Related U.S. Application Data

(60) Provisional application No. 61/312,256, filed on Mar. 10, 2010.

(30) Foreign Application Priority Data

Mar. 10, 2010 (EP) .................................... 10156029

(51) Int. Cl.
*H04B 15/00* (2006.01)

(52) U.S. Cl.
USPC ........... 375/285; 375/220; 375/223; 375/254; 375/261; 375/271; 375/295; 375/298; 375/302; 375/316; 375/322; 375/346; 455/63.1; 455/67.13; 455/69; 455/91; 455/114.3; 455/130; 370/335; 370/342; 327/551; 330/149

(58) Field of Classification Search
USPC ................. 375/220, 223, 254, 261, 271, 285; 375/295, 296, 298, 302, 316, 322, 346; 455/63.1, 67.13, 69, 91, 114.3, 130; 370/335, 370/342; 327/551; 330/149
See application file for complete search history.

(56) References Cited

U.S. PATENT DOCUMENTS

| 5,491,715 | A | 2/1996 | Flaxl |
|---|---|---|---|
| 6,424,820 | B1 | 7/2002 | Burdick et al. |
| 2002/0183013 | A1 | 12/2002 | Auckland et al. |
| 2005/0036638 | A1 | 2/2005 | Reithinger |
| 2005/0110700 | A1 | 5/2005 | Terry |
| 2005/0255843 | A1 | 11/2005 | Hilpisch et al. |
| 2008/0158076 | A1 | 7/2008 | Walley |
| 2009/0215422 | A1 | 8/2009 | Ikeda et al. |

FOREIGN PATENT DOCUMENTS

| EP | 0 261 935 A2 | 3/1988 |
|---|---|---|
| EP | 1 107 472 A2 | 6/2001 |
| EP | 1 460 769 A1 | 9/2004 |
| EP | 1 480 492 A2 | 11/2004 |
| EP | 1 777 644 A1 | 4/2007 |
| WO | WO 2005/053179 A1 | 6/2005 |
| WO | WO 2005/055654 A1 | 6/2005 |

*Primary Examiner* — Leon Flores
(74) *Attorney, Agent, or Firm* — Birch, Stewart, Kolasch & Birch, LLP (57) ABSTRACT

A wireless communication system includes a) a first device having a transmitter part with a Tx-antenna for transmitting an electrical signal having a signal bandwidth $BW_{sig}$ and b) a second device having a receiver part with an Rx-antenna for receiving the transmitted electromagnetic signal. At least one of the Tx- and Rx- antennas is a narrowband antenna having an antenna bandwidth $BW_{ant}$, wherein the Tx- and/or Rx-antenna bandwidths fulfil the relation $BW_{ant}=k \cdot BW_{sig}$. The system is adapted to provide that k is smaller than 1.25, and the antenna bandwidth $BW_{ant}$ is defined as the −3dB bandwidth of the loaded antenna when it is connected to the communication system, and the signal bandwidth $BW_{sig}$ is defined as the bandwidth within which 99% of the desired signal power is located.

22 Claims, 5 Drawing Sheets

WIRELESS COMMUNICATION SYSTEM WITH A MODULATION BANDWIDTH COMPARABLE TO OR EXCEEDING THE BANDWIDTH OF THE TRANSMITTER AND/OR RECEIVER ANTENNAS

CROSS REFERENCE TO RELATED APPLICATIONS

This nonprovisional application claims the benefit of U.S. Provisional Application No. 61/312,256 filed on Mar. 10, 2010 and to Patent Application No. 10156029.0 filed in Europe on Mar. 10, 2010. The entire contents of the above applications are hereby incorporated by reference into the present application.

TECHNICAL FIELD

The present application relates to antennas for wireless communication systems, e.g. for such systems comprising portable devices, e.g. listening devices. The disclosure relates specifically to a wireless communication system. The application furthermore relates to a radio frequency receiver part and to a radio frequency transmitter part for use in a wireless communication system.

The application moreover relates to the use of a narrowband antenna for transmitting or receiving a signal in a communication system and to a method of calibrating a narrowband antenna/tank frequency transfer function of a wireless communication system.

The disclosure may e.g. be useful in applications involving devices such as handheld communication devices, e.g. listening devices involving wireless communication.

BACKGROUND ART

In normal communication systems, antenna bandwidth ($BW_{ant}$) is much larger than the bandwidth of the signal ($BW_{sig}$) to be transmitted and received to make sure that all the signal power is received and not corrupted in any way.

Some antennas become more efficient as their bandwidth is reduced. In particular that is true for resonated magnetic link antennas as the ones typically used in connection with hearing aids. However, if the antenna bandwidth is too narrow, the antenna frequency response will distort the communication signal. The trade off between antenna efficiency and signal distortion leads to a certain optimal antenna bandwidth of existing systems.

EP 0 261 935 A2 discloses an electrically small antenna for receiving or transmitting radio signals. EP 0 261 935 A2 describes the tuning of the centre frequency to a specific value thereby eliminating the effect of tolerances of reactive components. This provides for operating the antenna with a smaller natural bandwidth (and thereby a better antenna efficiency).

US 2008/158076 A1 describes a narrow band antenna for use in wide band (multi-channel) systems. The effective bandwidth of a dynamically adjustable antenna with a narrow natural bandwidth delineated by a first frequency change can be moved from the natural bandwidth to another narrow bandwidth of interest within a wide band spectrum using a tuning circuit. The natural (narrow) bandwidth is still wider than the modulation bandwidth.

DISCLOSURE OF INVENTION

Figure 3:
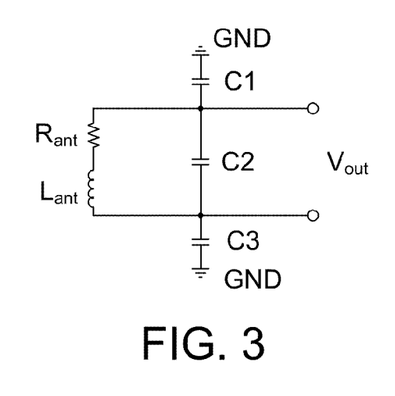
FIG. 3 shows an example of an antenna/tank circuit.
Figure 5A:
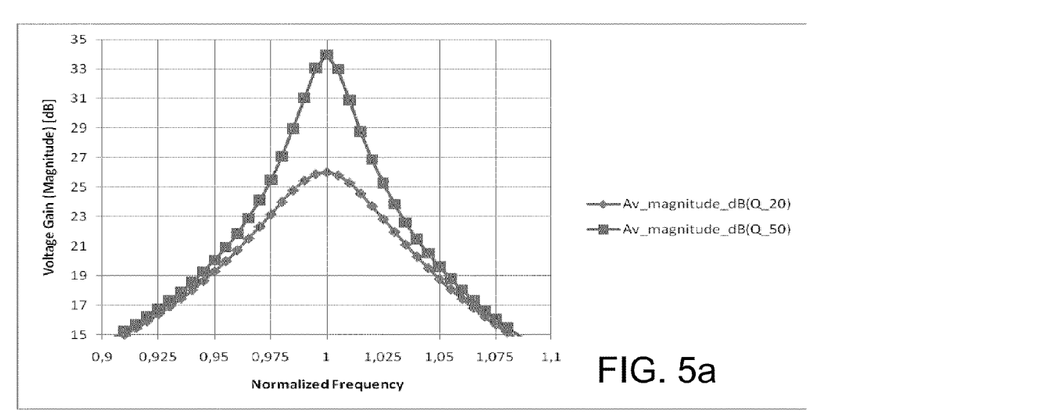
Figure 5B:
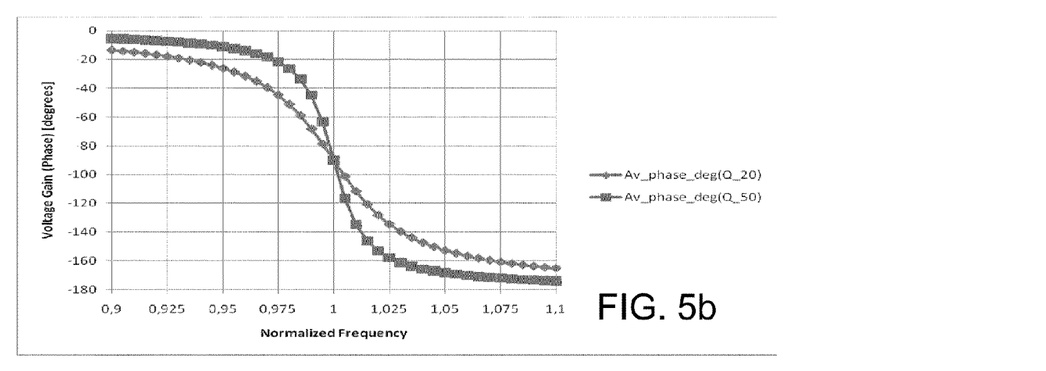

In systems with electrically small antennas there is a link budget advantage by increasing the antenna Q-factor, i.e. by reducing $BW_{ant}$ (cf. an example of such circuit in FIG. 3 representing a second order system for which $Q_{ant}=f_0/BW_{ant}$, $f_0$ being the resonance frequency of the antenna/tank circuit). In such case, it can be relevant to use an antenna bandwidth only marginally larger than the signal bandwidth, i.e. k>1, where $k=BW_{ant}/BW_{sig}$. Beyond this point (i.e. k≦1) there may be so much signal distortion, as illustrated in FIG. 5a, 5b, that the link budget becomes worse, i.e. the transmission range or data rate is reduced (if the antenna distortion is not corrected).

The term 'antenna bandwidth' ('$BW_{ant}$') is in the present context taken to mean the bandwidth of the antenna when connected to the communication system (not the bandwidth of the stand alone antenna). Correspondingly, e.g. when referring to the blocks Tx and Rx in the drawings or to 'antenna transfer functions', the term 'antenna' or 'narrow band antenna' is taken to mean the 'resonating system comprising the antenna and tuning or loading components' (e.g. the load capacitance of an LC resonating or tuning system comprising an exemplary (e.g. inductive) narrow band antenna, cf. e.g. FIG. 3, including e.g. possible capacitance of the load system connected to terminals $V_{out}$).

The terms 'antenna/tank circuit' and 'antenna and tuning circuit' are used interchangeably and are not intended to have different meanings, unless specifically indicated. The terms cover the resonating system constituted by the antenna and other components electrically connected to the antenna and responsible for storing and emitting or receiving electromagnetic energy during transmission or reception of an electrical signal (cf. e.g. FIG. 3, 4).

A Wireless Communication System:

An object of the present application is to provide a wireless communication system having a relatively large signal bandwidth with an electrically small antenna. Another object is to provide a wireless communication system suitable for use in a portable (e.g. battery driven) device or system.

Objects of the application are achieved by the invention described in the accompanying claims and as described in the following.

An object of the application is achieved by a wireless communication system comprising a) a first device comprising a transmitter part comprising a Tx-antenna for transmitting an electrical signal having a signal bandwidth $BW_{sig}$ and b) a second device comprising a receiver part comprising an Rx-antenna for receiving the transmitted electromagnetic signal, at least one of the Tx- and Rx-antennas is a narrowband antenna having an antenna bandwidth $BW_{ant}$, wherein the Tx- and/or Rx-antenna bandwidths fulfil the relation $BW_{ant}=k \cdot BW_{sig}$. The system is characterized in that the system is adapted to provide that k is smaller than 1.25, and the antenna bandwidth $BW_{ant}$ is defined as the −3 dB bandwidth of the loaded antenna when it is connected to the communication system, and the signal bandwidth $BW_{sig}$ is defined as the bandwidth within which 99% of the signal power is located. Preferably, the transmitted signal is modulated according to a bandwidth effective modulation scheme, e.g. a digital modulation scheme.

The term 'the signal bandwidth $BW_{sig}$ is defined as the bandwidth within which 99% of the signal power is located' is in the present context taken to mean that '99% of the desired signal power is located within said bandwidth. The term '99% of the desired signal power' is intended to mean 'the occupied 99% bandwidth of the main lobe(s) of the ideal modulation spectrum of the used modulation type'. This is also intended to exclude spectral components caused by transmitter hardware non-idealities like e.g. spurs or spectral re-growth.

This has the advantage of providing a wireless communication system suitable for use in relatively small and/or low power devices.

In an embodiment, the first and/or the second device is/are a low power device.

The term 'low power device' is in the present context taken to mean a device whose energy budget is restricted, e.g. because it is a portable device, e.g. comprising an energy source (e.g. of limited size, e.g. with a maximum capacity of 1000 mAh, such as 500 mAh, such as 250 mAh), which—without being exchanged or recharged—is of limited duration (the limited duration being e.g. of the order of hours or days, e.g. max. 1 or 3 or 7 or 10 days (during normal operation of the device), such duration being limited compared to the expected life time of the device). In an embodiment, a low power device is a device with power consumption smaller than 50 mW, such as smaller than 10 mW, such as smaller than 5 mW.

In an embodiment, the wireless communication system further comprises at least one compensation unit, e.g. in the form of an equalization filter, electrically connected to the Tx- or to the Rx-antennas, wherein the compensation unit(s) is/are adapted for compensating for the amplitude and/or phase distortion introduced by the narrowband Tx- and/or Rx-antennas. In an embodiment, one compensation unit located in either of the transmitter or receiver parts is adapted to compensate for the amplitude and/or phase distortion introduced by the narrowband Tx- and/or Rx-antennas. In an embodiment, the transmitter and receiver parts each comprise a compensation unit to compensate for amplitude and/or phase distortion introduced by their respective narrowband Tx- and Rx-antennas. Taking the transmitter part as an example, and assuming that the Tx-antenna frequency response is described by the transfer function $H_{Tx}(s)$, s being the Laplace-parameter, and the compensation unit of the transmitter part is adapted to have a transfer function of $1/H_{Tx}(s)$, the total frequency response is $(1/H_{Tx}(s))*H_{Tx}(s)=1$ and distortions are effectively cancelled out (compensated), when said compensation unit is applied to said Tx-antenna. Correspondingly, in a receiver part, if the signal is received by an antenna with transfer function $H_{Rx}(s)$ and then filtered by a filter with transfer function $(1/H_{Rx}(s))$, the total frequency response is $H_{Rx}(s)*(1/H_{Rx}(s))=1$ and distortions are effectively cancelled out (compensated).

An advantage of a system with electrically small antennas using correction of antenna distortion is that the link budget (i.e. transmission range and/or data rate) improves down to a lower value of the bandwidth ratio, e.g. down to k=0.25, depending e.g. on modulation type, and available signal processing power/resources.

In an embodiment, the first and/or the second device comprise(s) a transmitter part comprising a Tx-antenna for transmitting an electrical signal having a signal bandwidth $BW_{sig}$ and a receiver part comprising an Rx-antenna for receiving the transmitted electromagnetic signal. In an embodiment, the Tx-antenna and the Rx-antenna are constituted by the same physical entity (a Tx/Rx-antenna). In an embodiment the first and/or the second device comprise(s) circuitry allowing the device to be used in a transmit mode (Tx) and a receive mode (Rx), where the same Tx/Rx-antenna is used in both modes for, respectively, transmission and reception.

In an embodiment, the transmitter and receiver parts each further comprises a frequency transposition unit (e.g. a mixer) electrically connected to the Tx- and Rx-antennas of the transmitter and receiver parts, respectively, the frequency transposition units being adapted for transforming a frequency range of an input signal to another frequency range, and wherein the compensation unit(s) is/are adapted for compensating for the amplitude and/or phase distortion introduced by the Tx- and/or Rx-antennas in combination with said frequency transposition units.

In general, the compensation unit, e.g. an equalization filter, for compensating or equalizing a distortion in a transmitted signal is designed according to the following procedure:

a) Given a modulation scheme, a modulation bandwidth of the signal to be transmitted, and an antenna to be used for the transmission, the transfer function $H_{Tx,ant}(f)$ of an antenna covering the given modulation bandwidth is determined;

b) A compensation unit, e.g. an equalization filter, having the mathematical inverse transfer function $H_{eq}(f)=1/H_{Tx,ant}(f)$, at least in a frequency range including the modulation bandwidth to be transmitted, is determined, e.g. using polynomials to describe the transfer function.

In case the transfer function of the antenna is not available, such function can be generated by measurement, e.g. by monitoring its response to the application of a number of test tones of different frequencies in the frequency range of interest (incl. the modulation bandwidth).

In an embodiment, the compensation unit(s), e.g. equalization filter(s), is/are implemented as first order filter(s) with a real zero located at about the same frequency as the real dominant pole of the combined antenna and frequency translating blocks. This has the advantage of providing a relatively simple implementation of the equalization filter. This solution is particularly advantageous in an embodiment wherein the narrowband antenna(s) can be approximately represented (e.g. is dominated) by a second order transfer function and a resonance frequency that is equal to a centre frequency of the transmitted (wireless) signal.

The term 'at about the same frequency as the real dominant pole of the antenna block(s) or of the combined antenna and frequency translating blocks' is taken to mean that the difference in frequency is smaller than 20%, such as smaller than 10%, such as smaller than 5%.

In an embodiment, k is smaller than or equal to 1.0, such as smaller than or equal to 0.75, such as smaller than or equal to 0.5. In an embodiment, k is in the range from 0.1 to 1.25, such as in the range from 0.1 to 1.0, such as in the range from 0.1 to 0.75, such as in the range from 0.1 to 0.5, e.g. in the range from 0.2 to 0.4.

In general, the wireless link established by the transmitter and receiver parts can be of any type. In an embodiment, the wireless link is used under power constraints in that at least one of the devices comprises a portable (typically battery driven) communication or listening device. In an embodiment, the wireless link is a link based on near-field communication, e.g. an inductive link based on an inductive coupling between antenna coils of the transmitter and receiver parts of the first and second communication devices, respectively. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation), or a digital modulation scheme, e.g. digital amplitude modulation, such as ASK (amplitude shift keying), e.g. On-Off keying, or digital frequency or phase modulation, such as FSK (frequency shift keying), PSK (phase shift keying) or QAM (quadrature amplitude modulation).

In an embodiment, the transmitter and receiver parts are adapted to implement a wireless link based on inductive coupling between the transmitting and receiving antennas. In such embodiment, the Tx- and Rx-antennas comprise inductance coils, which when the first and second devices comprising the transmitter and receiver parts, respectively, are brought within an operating distance of each other have a mutual inductive coupling sufficient for transferring the electrical signal from the transmitter part to the receiver part. In an embodiment, the system is adapted to provide that such operating distance is up to 0.1 m, such as up to 0.3 m, such as up to 0.5 m, such as larger than 1 m, e.g. up to 2 m or more. In an embodiment, the system is adapted to provide that such operating distance is in the range from 0.3 m to 50 m, e.g. in the range from 0.3 m to 5 m, e.g. in the range from 0.3 m to 1.5 m. The operating distance depends among other parameters on the transmit power, transmit frequency/bit rate, signal bandwidth, etc.

Various aspects of inductive communication are e.g. discussed in EP 1 107 472 A2, EP 1 777 644 A1 and US 2005/0110700 A1. WO 2005/055654 and WO 2005/053179 describe various aspects of a hearing aid comprising an induction coil for inductive communication with other units. A protocol for use in an inductive communication link is e.g. described in US 2005/0255843 A1.

In an embodiment, the at least one of the narrow band antenna(s) is an electrically small antenna. An 'electrically small antenna' is in the present context taken to mean that the spatial extension of the antenna (e.g. the maximum physical dimension in any direction) is much smaller than the wavelength $\lambda_{Tx}$ of the transmitted electric signal. In an embodiment, the spatial extension of the antenna is a factor of 10, or 50 or 100 or more, or a factor of 1 000 or more, smaller than the carrier wavelength $\lambda_{Tx}$ of the transmitted signal.

In an embodiment, the wireless communication system is adapted to provide that the resonance frequency $f_0$ of the Tx- and/or Rx-antennas can be tuned to a desired value within a predefined range of resonance frequencies. This can e.g. be done by switching in or out extra capacitance in the resonance circuit of an inductive antenna (e.g. an induction coil or loop antenna) or by switching in or out extra inductance in the resonance circuit of a capacitive antenna (e.g. a patch antenna) or a combination. In an embodiment, the transmitter and/or receiver parts comprise(s) a number of trim capacitors for providing tuning of the resonance frequency. In an embodiment, the integrated circuit comprises a processing unit. Preferably the first (transmitting) as well as the second (receiving) device comprise a processing unit adapted for communicating with (or form part of) the transmitter and receiver parts of the devices. The processing units may fully or partially perform the tasks of frequency transposition and equalization. The processing units are preferably adapted to measure the current resonance frequency $f_0$ and bandwidth $BW_{ant}$ of the Tx- and Rx-antenna parts, respectively. The processing units may further be adapted to be able to modify (calibrate) the transfer function of the compensation units, e.g. equalization filters (FILTER-Tx and FILTER-Rx of FIG. 1), and/or the tuning of the antenna parts (Tx, Rx in FIG. 1) based on the measurements of current resonance frequency $f_0$ and bandwidth $BW_{ant}$ of the Tx- and Rx-antenna parts to dynamically keep the distortions introduced by the narrow band antenna(s) at a minimum. The tuning of the antenna parts can e.g. be implemented by adapting the processing unit to control the switching in or out of the trim capacitors. Preferably, the system is adapted to provide that calibration is performed at predefined points in time, e.g. regularly, e.g. at a frequency larger than 0.01 Hz, such as larger than 0.1 Hz, such as larger than 1 Hz. In an embodiment, the calibration frequency is linked to the temperature of the device in question. In an embodiment, the signal processing unit form part of an integrated circuit. In an embodiment, the integrated circuit further comprises trimming capacitors for use in calibrating the resonance frequency $f_0$ and bandwidth $BW_{ant}$ of the Tx- and Rx-antenna parts.

In an embodiment, the wireless communication system comprises more than two devices each comprising at least a transmitter part or a receiver part. In an embodiment, the first and second devices each comprise a transmitter part and a receiver part for enabling the establishment of a bi-directional wireless link between them.

In an embodiment, the communication system comprises a communication device, e.g. a cellular telephone. In an embodiment, the communication system comprises a listening device, e.g. a hearing instrument or a headset or an active ear plug, or a headphone, or an audio gateway for receiving a number of audio signals from a number of different audio sources and for transmitting a selected one of the received audio signals to a listening device, or a combination thereof.

A Receiver Part and/or a Transmitter Part:

A radio frequency receiver part for receiving radio signals within a first frequency band of width BWsig via an antenna and a tuning circuit, the antenna and the tuning circuit together being tuned to a second frequency band of width BWant overlapping with the first frequency band and fulfilling the relation $BW_{ant} = k \cdot BW_{sig}$ is furthermore provided by the present application. The receiver part is adapted to provide or accept that k is smaller than 1.25, where the antenna bandwidth $BW_{ant}$ is defined as the −3 dB bandwidth of the loaded antenna, and the signal bandwidth $BW_{sig}$ is defined as the bandwidth within which 99% of the signal power is located, and the receiver part is adapted to compensate within a part of or the entire first frequency band for such phase and or amplitude changes to the received radio signals that are caused by the antenna and the tuning circuit. Preferably, the receiver part is adapted to receive radio signals modulated according to a bandwidth effective modulation scheme, e.g. a digital modulation scheme.

A radio frequency transmitter part for transmitting radio signals within a first frequency band of width $BW_{sig}$ via an antenna and a tuning circuit, the antenna and the tuning circuit together being tuned to a second frequency band of width $BW_{ant}$ overlapping with the first frequency band and fulfilling the relation $BW_{ant} = k \cdot BW_{sig}$ is moreover provided by the present application. The transmitter part is adapted to provide that k is smaller than 1.25, where the antenna bandwidth $BW_{ant}$ is defined as the −3 dB bandwidth of the loaded antenna, and the signal bandwidth $BW_{sig}$ is defined as the bandwidth within which 99% of the signal power is located, and the transmitter part is adapted to pre-compensate within a part of or the entire first frequency band for such phase and or amplitude changes to the transmitted radio signals that are caused by the antenna and the tuning circuit. Preferably, the transmitter part is adapted to transmit radio signals modulated according to a bandwidth effective modulation scheme, e.g. a digital modulation scheme.

The term 'the antenna and the tuning circuit together being tuned to a second frequency band of width $BW_{ant}$ overlapping with the first frequency band' is in the present context taken to mean that the second frequency band has a specific bandwidth $BW_{ant}$ located at a resonance frequency $f_0$ allowing it to overlap with (e.g. being included in) the first frequency band (of width $BW_{sig}$).

In an embodiment, the (receiver and/or transmitter) part is adapted to primarily or ONLY compensate for distortion caused by the antenna and the tuning circuit. I.e. such distortion that is due to the transmission path from transmitter to receiver is NOT (intendedly) compensated for. In an embodiment, the (receiver and/or transmitter) part comprises a compensation unit for providing said compensation for distortion caused by the antenna and the tuning circuit.

In an embodiment, the (receiver and/or transmitter) part comprises a filter adapted to perform at least a portion of the compensation.

In an embodiment, the (receiver and/or transmitter) part comprises a signal processor adapted to perform at least a portion of the compensation. In an embodiment, the signal processor is a digital signal processor. In an embodiment, the part comprises an analogue to digital converter to digitize a received signal with a predefined sampling frequency. In an embodiment, the part comprises a digital to an analogue converter to convert a digital signal to an analogue signal with a predefined sampling frequency.

In an embodiment, the (receiver and/or transmitter) part comprises a measurement circuit adapted to measure the tuning frequency and/or the bandwidth of the antenna and the tuning circuit. In an embodiment, the part is adapted to adjust the compensation by the compensation unit(s), e.g. equalization filter(s) and/or the tuning of the antenna in dependence of the measured values.

In an embodiment, the (receiver and/or transmitter) part is adapted to receive and transmit, respectively, radio signals that are modulated according to a digital modulation scheme, e.g. digital amplitude modulation, such as ASK (amplitude shift keying), e.g. On-Off keying, or digital frequency or phase modulation, such as FSK (frequency shift keying), PSK (phase shift keying) or QAM (quadrature amplitude modulation).

In an aspect, a TxRx-device is provided, comprising a receiver part and a transmitter part. In an embodiment, the antenna for receiving a radio signal and the antenna for transmitting a radio signal are constituted by the same physical entity (a Tx/Rx-antenna). In an embodiment the TxRx-device comprises circuitry allowing the device to be used in a transmit mode (Tx) and a receive mode (Rx), where the same (Tx/Rx) antenna is used in both modes for, respectively, transmission and reception.

In an aspect, a TxRx-system comprising first and second TxRx-devices adapted to communicate with each other is provided.

It is intended that the structural features of the communication system described above, in the detailed description of 'mode(s) for carrying out the invention' and in the claims can be combined with the receiver and transmitter parts (or TxRx-devices), where appropriate and vice versa.

Use of a Narrowband Antenna:

Use of a narrowband antenna for transmitting or receiving a signal in a communication system is moreover provided by the present application. The use is characterized in that the ratio k of the bandwidth $BW_{ant}$ of the narrowband antenna to the bandwidth $BW_{sig}$ of the signal is smaller than 1.25, and wherein the antenna bandwidth $BW_{ant}$ is defined as the −3 dB bandwidth of the loaded antenna when it is connected to the rest of the communication system, and the signal bandwidth $BW_{sig}$ is defined as the bandwidth within which 99% of the signal power is located. Preferably, the transmitted or received signal is modulated according to a bandwidth effective modulation scheme, e.g. a digital modulation scheme.

In an embodiment, the transmitted or received signal is modulated according to a digital modulation scheme, e.g. digital amplitude modulation, such as ASK (amplitude shift keying), e.g. On-Off keying, or digital frequency or phase modulation, such as FSK (frequency shift keying), PSK (phase shift keying) or QAM (quadrature amplitude modulation).

In an embodiment, the transmit- and/or receive-signal is processed in a way that counteracts the amplitude and/or phase distortion of a narrowband antenna. This allows for the use of a more narrowband antenna with better efficiency.

In a specific implementation of this technique, the antenna bandwidth has been reduced by a factor of 4, leading to a 6 dB higher transmitter antenna efficiency and a 6 dB higher receiver antenna efficiency. The communication link can therefore (in the present implementation) be improved by in the order of 12 dB.

In an embodiment, k is smaller than or equal to 1.0, such as smaller than or equal to 0.75, such as smaller than or equal to 0.5. In an embodiment, k is in the range from 0.1 to 1.25, such as in the range from 0.1 to 1.0, such as in the range from 0.1 to 0.75, such as in the range from 0.1 to 0.5, e.g. in the range from 0.2 to 0.4.

In an embodiment, the communication system comprises a listening device, e.g. a hearing instrument or a headset or an active ear plug, or a headphone, or a telephone (e.g. a cellular telephone), or an audio gateway for receiving a number of audio signals from a number of different audio sources and for transmitting a selected one of the received audio signals to a listening device, or a combination thereof.

In an embodiment, the narrowband antenna is an electrically small antenna, e.g. in the sense that the antenna dimensions are much smaller than a centre wavelength of the signal to be transmitted (e.g. more than 10 times smaller).

In an embodiment, the bandwidth of the signal $BW_{sig}$ intended to be transmitted and received is larger than 200 kHz, e.g. larger than 500 kHz, such as larger than 1 MHz. In an embodiment, the bandwidth of the signal $BW_{sig}$ is in the range from 200 kHz to 10 MHz, e.g. in the range from 200 kHz to 2 MHz.

Use of a Wireless Communication System:

In an aspect, use of a communication system as described above, in the detailed description of 'mode(s) for carrying out the invention', and in the claims is furthermore provided. Embodiments of the use have the same advantages as the corresponding systems.

Use of a TxRx-Device or a TxRx-System:

In an aspect, use of a TxRx-device or a TxRx-system as described above, in the detailed description of 'mode(s) for carrying out the invention', and in the claims is furthermore provided.

A Method of Operating a Wireless Communication System:

In an aspect, a method of operating a wireless communication system is provided, the system comprising a) a first device comprising a transmitter part comprising a Tx-antenna for transmitting an electrical signal having a signal bandwidth $BW_{sig}$;

b) a second device comprising a receiver part comprising an Rx-antenna for receiving the transmitted electromagnetic signal; the method comprising A) providing that at least one of the Tx- and Rx-antennas is a narrowband antenna having an antenna bandwidth $BW_{ant}$, wherein the Tx- and/or Rx-antenna bandwidths fulfil the relation $BW_{ant}=k \cdot BW_{sig}$;

B) providing that k is smaller than 1.25,

Wherein the antenna bandwidth $BW_{ant}$ is defined as the −3 dB bandwidth of the loaded antenna when it is connected to the communication system, and the signal bandwidth $BW_{sig}$ is defined as the bandwidth within which 99% of the signal power is located.

Preferably, the transmitted electrical signal is modulated according to a bandwidth effective modulation scheme, e.g. a digital modulation scheme. In an embodiment, the transmitted signal is modulated according to a digital modulation scheme, e.g. digital amplitude modulation, such as ASK (amplitude shift keying), e.g. On-Off keying, or digital frequency or phase modulation, such as FSK (frequency shift keying), PSK (phase shift keying) or QAM (quadrature amplitude modulation).

In an embodiment, the method comprises providing that transmitted and/or received electromagnetic signal is processed in a way that compensate the amplitude and/or phase distortion of the narrowband antenna(s). This allows for the use of a more narrowband antenna with better efficiency.

In an embodiment, the method comprises providing that k is smaller than or equal to 1.0, such as smaller than or equal to 0.75, such as smaller than or equal to 0.5. In an embodiment, k is in the range from 0.1 to 1.25, such as in the range from 0.1 to 1.0, such as in the range from 0.1 to 0.75, such as in the range from 0.1 to 0.5, e.g. in the range from 0.2 to 0.4.

In an embodiment, the method comprises calibrating the narrowband antenna/tank frequency transfer function. In an embodiment, the method comprises calibrating the narrowband antenna/tank frequency transfer function prior to the use of the wireless communication system, e.g. as part of a start-up procedure. In an embodiment, the method comprises calibrating the narrowband antenna/tank frequency transfer function during use of the wireless communication system.

The antenna/tank frequency transfer function is characterized by two parameters 1) the resonance frequency $f_0$ and 2) the quality factor Q.

In an embodiment, the method comprises
Providing that the resonance frequency $f_0$ of the antenna/tank circuit is tuned to the desired value, e.g. with a trim capacitor array; and
Providing that the transmitter/receiver signal processing is adapted to the quality factor Q of the antenna/tank.

The transmitter/receiver signal processing comprises e.g. the provision of appropriate equalization to compensate for the distortion of the narrow band antenna(s).

The primary parameter that may need to be trimmed (calibrated) is the resonance frequency $f_0=1/(2\pi LC)$, which must be very close to the center frequency of the system, e.g. 10 MHz (+/−10 kHz). L is determined by the antenna coil, e.g. fixed to≈10 μH (+/−5%). The capacitance C, which is e.g. fully or partially implemented as on-chip capacitance has e.g. a tolerance of +/−15%, so in that case trimming is preferably performed. This is done by switching a number of unit capacitors in or out until the total capacitance has the value that gives resonance at the desired frequency $f_0$. A one-time factory calibration may in some cases be sufficient. However, in an embodiment, the calibration method is implemented as an automated, e.g. a built-in, self calibration (e.g. at predefined points in time), e.g. to track the effect of slowly varying parameters, e.g. the temperature. In an embodiment, additionally or alternatively, the calibration can be initiated by a user via a user interface to the communication system.

The second parameter that can be measured and possibly trimmed is the quality factor i.e. the Q-factor (or equivalently the bandwidth for a system where $BW_{-3dB}=f_0/Q$). In an embodiment, the method comprises measuring the Q-factor so that the digital compensation (e.g. equalization) is done correctly. This measurement is preferably done once in a while (e.g. at predefined points in time) to track the effect of slowly varying parameters, e.g. the temperature.

In an embodiment, the method comprises providing that the Q-value is tuned to an appropriate level, which the wireless communication system is designed to be able to handle to be able to keep the quality of the transmission and reception within specified limits (e.g. having a maximum predefined bit error rate, BER, or minimum field strength or signal to noise ratio, S/N, of a received signal). In an embodiment, the Q factor is lowered to be able to increase a signal bandwidth or transmission bit rate. This lowering of Q seriously impacts the link budget, but can still be attractive in applications where relatively short transmission ranges (e.g. below 0.1 m) are needed or sufficient, e.g. for a programming scenario for uploading configuration data or other data from a first (e.g. programming) device to a communication device or a listening device (e.g. to be programmed) with a relatively high data rate over a relatively short distance (e.g. less than a few centimeters between the transmitter and receiver of the two devices). In such cases the Q-trimming (reduction) is e.g. performed by adjusting the output impedance of the power amplifier (PA) driver stage of the transmitting part (increasing the series resistance adds loss to the tank—effectively reducing the tank Q-factor).

In an embodiment, the method further comprises providing that the signal processing (including the equalization to compensate for the distortion of the narrow band antenna(s)) is adapted to the current quality factor Q of the antenna/tank in an automatic routine, e.g. performed at predefined times or instances, e.g. during startup of the system, and/or on request of a user (e.g. via a user interface, e.g. an activation element, of the device(s) in question).

It is intended that the structural features of the system described above, in the detailed description of 'mode(s) for carrying out the invention' and in the claims can be combined with the method of operating a wireless communication system, when appropriately substituted by a corresponding process and vice versa.

A Tangible Computer-Readable Medium:

A tangible computer-readable medium storing a computer program comprising program code means for causing a data processing system to perform at least some (such as a majority or all) of the steps of the method described above, in the detailed description of 'mode(s) for carrying out the invention' and in the claims, when said computer program is executed on the data processing system is furthermore provided by the present application. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A Data Processing System:

A data processing system comprising a processor and program code means for causing the processor to perform at least some (such as a majority or all) of the steps of the method described above, in the detailed description of 'mode(s) for carrying out the invention' and in the claims is furthermore provided by the present application. In an embodiment, the processor is an audio processor specifically adapted for processing audio signals. In an embodiment, the processor form part of a communication device or a listening device.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which:

FIG. 1 shows elements of a wireless transmission system of relevance to the present application, FIG. 1a being a block diagram of a transmitter part and a receiver part of a first embodiment, FIG. 1b being a block diagram of a transmitter part and a receiver part of a second embodiment, and FIG. 1c illustrating an exemplary schematic relation between antenna and signal bandwidth based on a magnitude [dB] versus frequency f [Hz] plot, FIG. 2 relates to the implementation of an appropriate equalization filter for a communication system according to the present application, FIG. 2a showing the pole/zero plot of the antenna, FIG. 2b showing the pole zero plot of the combined antenna and frequency translating block, and FIG. 2c illustrating that the zero of the equalization filter has been added at the same frequency as the equivalent first order real pole filter, FIG. 5 shows the transfer function ($V_{out}/V_{in}$) for the antenna/tank circuit of FIG. 4, with Q=20 and Q=50, FIG. 5a showing a magnitude vs. frequency plot, FIG. 5b showing a corresponding phase vs. frequency plot, and FIG. 5c emphasizing the difference in voltage gain of the magnitude between a Q=50 and a W=20 antenna/tank circuit in a frequency range of interest.

The figures are schematic and simplified for clarity, and they just show details which are essential to the understanding of the disclosure, while other details are left out.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

MODE(S) FOR CARRYING OUT THE INVENTION

FIG. 1 shows elements of a wireless transmission system of relevance to the present application.

Figure 1A:
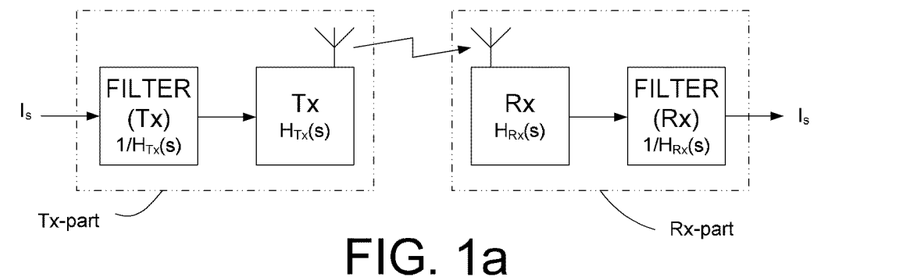

FIG. 1a is a block diagram of a transmitter part and a receiver part of a first embodiment, The wireless communication system comprises two physically separate devices, a first device comprising a transmitter part comprising a transmitter (Tx) for wirelessly transmitting a modulated electric signal to a receiver part of a second device, the receiver part comprising a receiver (Rx) adapted for receiving the modulated electric signal from the transmitter part. The transmitter (Tx) comprises a Tx-antenna (and tuning circuit) for transmitting the modulated signal. The receiver (Rx) comprises an Rx-antenna (and tuning circuit) for receiving the transmitted signal. It is generally assumed that the Tx- and/or Rx-antennas have a bandwidth $BW_{ant}$, which is substantially equal to or smaller than a modulation bandwidth $BW_{sig}$ of the modulated signal to be transmitted and received by the Tx- and Rx-antennas, respectively (cf. FIG. 1c). The transmitter and receiver parts each further comprises an equalization filter (FILTER) adapted for compensating for the transfer functions of the transmitter and receiver antennas, respectively (cf. FIG. 1a).

Figure 1B:
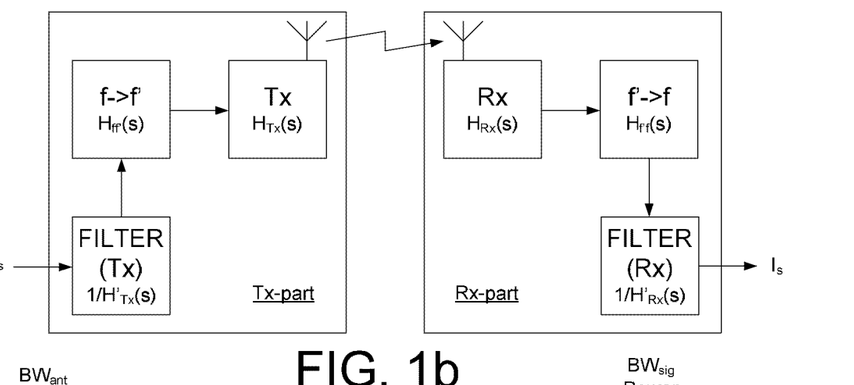

FIG. 1b is a block diagram of a transmitter part and a receiver part of a second embodiment, where the transmitter and receiver parts additionally each further comprise a frequency transposition unit (f->f' and f'->f, respectively, e.g. in the form of a mixer) adapted for transforming a frequency range of an input signal to another frequency range. A signal $I_s$ comprising an information to be transmitted from the transmitter part to the receiver part is filtered by the equalization filter (FILTER (Tx)) and the filtered signal is frequency transposed in the Tx-frequency transposition unit (f->f') and the resulting frequency transposed signal is fed to the Tx-antenna/tank circuit for being transmitted to the receiving part where the corresponding reception and signal processing functions are carried out (in units Rx, f'->f, FILTER(Rx)) to provide the received information signal $I_s$.

Figure 1C:
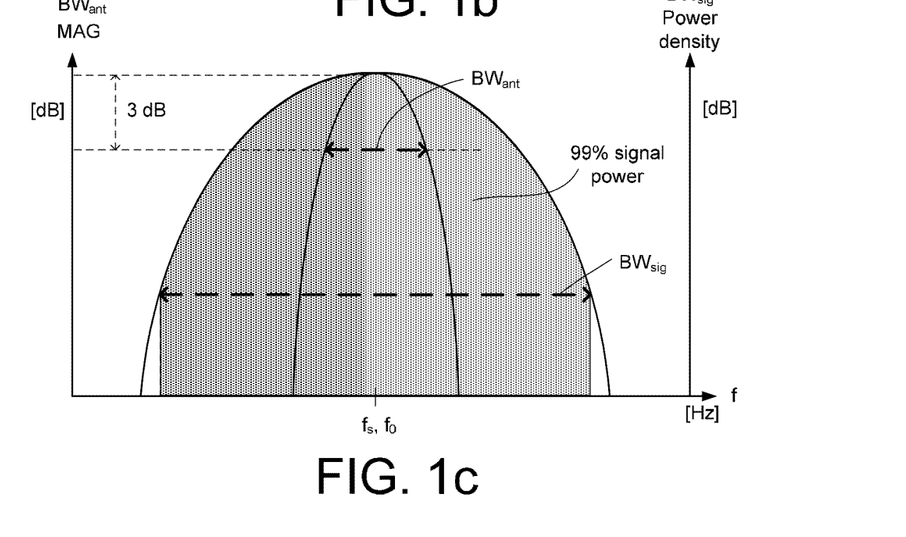

As illustrated in FIG. 1c (showing an exemplary schematic relation between antenna and signal bandwidth based on a magnitude [dB] versus frequency f [Hz] plot), to be able to consistently compare the bandwidth measures, it is in the present application assumed that the antenna bandwidth $BW_{ant}$ is the −3 dB bandwidth (cf. left vertical axis) and the signal bandwidth $BW_{sig}$ of the modulated signal to be transmitted via the wireless link established between the transmitter and receiver parts is a bandwidth corresponding to a part of the signal comprising 99% of the (desired) signal power (cf. right vertical axis). Other (consistent) bandwidth measures could be used. Preferably, the signal bandwidth $BW_{sig}$ is taken symmetrically around a centre signal frequency $f_s$ of the system (preferably identical or close to a resonance frequency $f_0$ of the narrow band antenna in question)

Assume that a narrowband antenna frequency response is described by the transfer function $H_{Tx}(s)$ (cf. block Tx in FIG. 1), s being the Laplace-parameter. In a transmitter, if the signal is filtered by an equalization filter with transfer function $1/H_{Tx}(s)$ (cf. block FILTER(Tx) in FIG. 1) and then applied to an antenna with frequency response $H_{Tx}(s)$, the total frequency response is $(1/H_{Tx}(s))*H_{Tx}(s)=1$ and distortions are effectively cancelled out (compensated).

Correspondingly, in a receiver (cf. block Rx in FIG. 1), if the signal is received with an antenna with transfer function $H_{Rx}(s)$ and then filtered by a filter with transfer function $(1/H_{Rx}(s))$ (cf. block FILTER(Rx) in FIG. 1), the total frequency response is $H_{Rx}(s)*(1/H_{Rx}(s))=1$ and distortions are effectively cancelled out (compensated).

In a system where frequency translation occur (cf. blocks f->f' and f'->f in the transmitter and receiver parts, respectively, of the embodiment in FIG. 1b) between the antenna and the equalization filter, the filter transfer functions are altered accordingly (cf. filter transfer functions $1/H'_{Tx}(s)$ and $1/H'_{Rx}(s)$ of the Tx- and Rx-filter blocks FILTER(Tx) and FILTER(Rx) in the transmitter and receiver parts, respectively, of the embodiment in FIG. 1b), so that the distortion introduced by the antenna blocks (of the frequency translated signals) are compensated for.

In the embodiments shown in FIGS. 1a and 1b, it is anticipated that the Tx- as well as the Rx-antenna blocks both have a bandwidth $BW_{ant}$, which is close to or smaller than a modulation bandwidth $BW_{sig}$ of the modulated signal to be transmitted and received (i.e. the antennas distort the transmitted and received signal, respectively) and that equalization to compensate for the consequent distortion is implemented by equalization filters FILTER (Tx) and FILTER (Rx) in the transmitter and receiver, respectively. The compensation for the distortion of the Tx- AND the Rx-antennas may alternatively be performed solely in the receiver or solely in the transmitter. Further, only one of the antennas may be a narrowband antenna (i.e. have the property that the antenna bandwidth $BW_{ant}$ is substantially equal to or smaller than a modulation bandwidth $BW_{sig}$).

In an embodiment, the antennas are electrically small, i.e. their spatial extension are much smaller than the wavelength $\lambda_s$ of the transmitted signal (e.g. a factor of 10, or 50 or 100 or more, smaller). In an embodiment, a centre frequency $f_s$ of the transmitted signal is in the MHz range, e.g. $f_s$=1 MHz or 10 MHz. In an embodiment, the modulation bandwidth $BW_{sig}$ is correspondingly in the kHz or in the MHz range, e.g. 100 kHz or 1 MHz, respectively. At a signal frequency $f_s$ of 1 MHz, the signal wavelength $\lambda_s$ is around 300 m. At 860 MHz, the wavelength in vacuum is around 0.35 m. At 2.4 GHz, the wavelength in vacuum is around 0.12 m. A state of the art portable communication device, e.g. a handheld mobile telephone has a maximum outer dimension of the order of 0.10 m. A state of the art listening device, e.g. a head set has a maximum outer dimension of the order of 0.05 m. A state of the art hearing instrument has a maximum outer dimension of the order of 0.01 m. In other words, the smaller the maximum outer dimension of the device (and thus of the antenna) and the lower the signal or carrier frequency, the farther away from a normal efficient antenna you get. In a hearing instrument using a carrier frequency of 10 MHz, the ratio of a signal wavelength (30 m) to maximum antenna dimension (0.01 m) is e.g. 3 000.

In an embodiment, the wireless link is based on an inductive coupling between inductive coils in the transmitter and receiver parts of the system. The modulation bandwidth $BW_{sig}$ is e.g. larger than or equal to the antenna bandwidth $BW_{ant}$. In an embodiment, the Tx- and/or Rx-antenna bandwidths is/are adapted to fulfil the relation $BW_{ant}=k \cdot BW_{sig}$, where k is smaller than 1.25, such as smaller than 1.0, such as smaller than 0.75, such as smaller than 0.5. In an embodiment, the system is adapted to provide that k is in the range from 0.1 to 1.25, e.g. in the range from 0.1 to 0.5. In an embodiment, the modulation or signal bandwidth $BW_{sig}$ is in the range from 50 kHz to 5 MHz.

In an embodiment, the transmitter and/or the receiver parts of the wireless transmission system comprise(s) a signal processing unit operatively coupled to the transmitter and receiver, respectively. The signal processing unit is adapted to (at least) process the radio signal (e.g. including performing the equalization and/or calibration and/or trimming tasks (cf. below) of the transmitter and/or the receiver parts in question).

The performance of the wireless communication system depends on the correspondence between the antenna/tank frequency transfer function and the signal processing applied in the transmitter and receiver (including the equalization filtering for compensating the distortion introduced by the narrow band antenna(s)). The antenna blocks (cf. e.g. Tx or Rx in FIG. 1) each comprise the antenna and corresponding resonance elements constituting the antenna-tank circuit (cf. e.g. FIG. 3). In an embodiment, the antenna blocks further comprise a driver or power amplifier (PA) for driving the Tx-antenna and/or a low noise amplifier (LNA) for amplifying the signal from the Rx-antenna, respectively. In an embodiment, a Tx- and an Rx-antenna of a given device is implemented as one and the same physical antenna. In an embodiment, the combined Tx- and Rx-antenna of a given device forms part of a transceiver unit comprising appropriate circuitry allowing a switching between a transmit and a receive mode of the transceiver. In a practical implementation of the system, the antenna/tank transfer function tolerances may be relatively large, and may, if not compensated for, degrade the performance of the system.

Hence, preferably the antenna/tank frequency transfer function is calibrated prior to operation of the system, e.g. in a booting routine, when the system is started (powered up). In an embodiment, the transmitter/receiver signal processing is further adapted to the antenna/tank transfer function.

The following calibration scheme can be envisioned:

The antenna/tank frequency transfer function is characterized by two parameters: the resonance frequency $f_0$ (cf. FIG. 1c) and the quality factor Q.

The resonance frequency $f_0$ of the antenna/tank is tuned to the desired value e.g. with a trim capacitor array (preferably in an automatic routine, e.g. performed during startup of the system, and/or possibly on request of a user).

The transmitter/receiver signal processing is adapted to the quality factor Q of the antenna/tank. Possibly the Q-value can also be tuned/reduced to a manageable level.

Knowledge of the actual (e.g. in situ measured) value of the Q factor is used in the processing of the received or transmitted signal (e.g. in the equalization filters to correctly compensate for the distortion resulting from the narrow band antenna transfer functions).

In an embodiment, a manageable level of Q is taken to mean a level of Q, which the wireless communication system is designed to be able to handle to be able to keep the quality of the transmission and reception within specified limits (e.g. of a quality measure, e.g. BER, e.g. of a received information signal $I_s$). In an embodiment, Q is increased by inserting a negative resistance circuit. In an embodiment, Q is decreased by adding loss to the circuit, e.g. by switching in additional resistance. In an embodiment, the Q value is intentionally lowered to increase the bandwidth. This can e.g. be of value in a situation where the wireless communication system comprises a programming unit and a unit (e.g. a listening device) to be programmed by the programming unit, and for which a relatively large transmission bit rate can be valuable. In an embodiment, the two devices are brought into closer proximity to each other to allow the increased transmission rate to be used with an acceptable quality. In an embodiment, at bit rate of more than 1 Mbit/s (or more than 1.5 Mbit/s) is established over a relatively short distance, e.g. less than 0.2 m or less than 0.1 m, or less than 0.05 m.

In general, the antenna/tank circuit can be of any kind which can be represented by a second or higher order transfer function. In a preferred embodiment, the antenna can be represented by a second order transfer function.

In an embodiment, a wireless communication system comprises the following blocks:
1) Narrowband antennas with a second order transfer function and a resonance frequency equal to the carrier frequency (cf. blocks Tx and Rx in FIG. 1). Such antennas are used in most magnetic links known in the art, cf. e.g. WO 2005/053179 A1.

2) A frequency translation block (Mixer, analogue or digital, cf. f->f' and f'->f blocks in FIG. 1. b). e.g. for translating from baseband to carrier frequency $f_c$ (or signal frequency $f_s$) or opposite and positioned between the antenna and the equalization filter.

3) An equalization filter (cf. FILTER(Tx) and FILTER(Rx) in FIG. 1).

In this aspect of the invention the idea is based on the observation that the joint frequency response of the antenna and (optionally) the frequency translating block approximately equals that of a first order, real pole, low pass filter in a region around DC.

Consequently, it is proposed to implement the equalization filter by means of a first order filter with a real zero located at about the same frequency as the (dominant) real pole of the combined antenna and frequency translating block. An example of the principle is illustrated in FIG. 2.

Figure 2A:
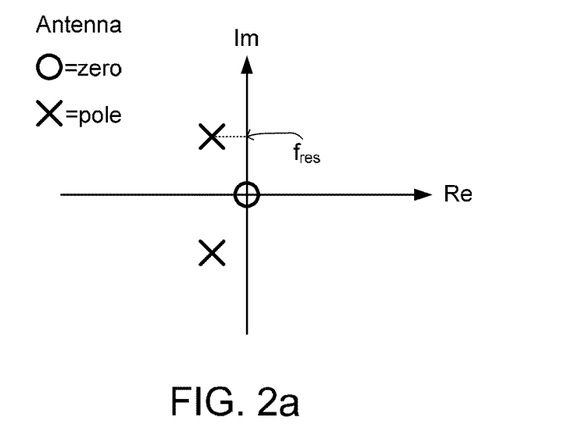
Figure 2B:
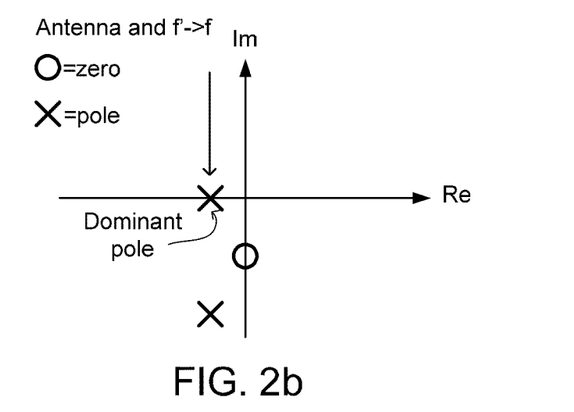
Figure 2C:
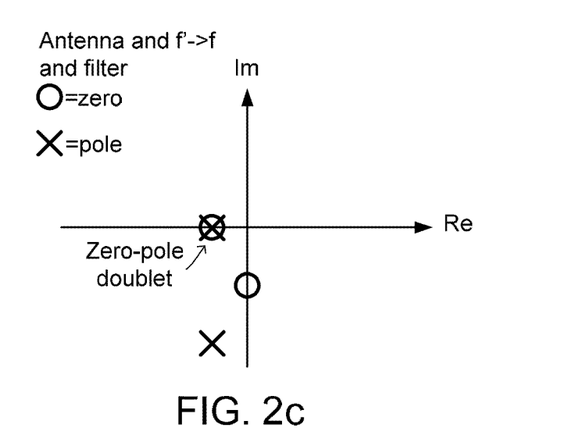

FIG. 2 shows relates to the implementation of an appropriate equalization filter for a communication system according to the present application, FIG. 2a showing the pole/zero plot of the antenna, FIG. 2b showing the pole zero plot of the combined antenna and frequency translating block, and FIG. 2c illustrating that the zero of the equalization filter has been added at the same frequency as the equivalent first order real pole filter.

In an embodiment, the narrow band antenna and tuning (or tank) circuit (e.g. Tx and/or Rx antenna blocks of FIG. 1) can be represented by a second order transfer function (e.g. the circuit in FIG. 3). In a preferred embodiment, the equalization filters of the transmitter and/or receiver parts (cf. FILTER(Tx) and FILTER(Rx) in FIG. 1) of the wireless communication system are implemented according to the principle illustrated in FIG. 2. Relating to FIG. 1, FIG. 2a illustrates poles and zeros for the transfer function $H_{Rx}(f)$ for the receiving antenna block (Rx). FIG. 2b illustrates poles and zeros for the transfer function $H_{Rx}(f'->f)$ for the receiving antenna (Rx) and the frequency translation block (f'->f). FIG. 2c illustrates poles and zeros for the transfer function $H_{Rx}(f'->f)*H_{Eq}(f)$ for the receiving antenna (Rx), the frequency translation block (f'->f), and the first order real zero filter $H_{Eq}$, where the transfer function $H_{Eq} \approx (1/H_{Rx}(f'->f))$ inside the modulation bandwidth.

FIG. 3 shows an example of an antenna/tank circuit. FIG. 3 shows an inductive antenna (e.g. a ferrite loaded loop antenna, $L_{ant}$ in FIG. 3) resonating with the systems capacitance C1, C2, C3 (e.g. comprising parasitic capacitance and/or intentional capacitance, preferably dominated by intentional capacitance—located on-chip or off-chip, the off-chip capacitance being e.g. SMD capacitance). Such an LC resonating system can be both balanced (as shown here, capacitances C1 and C3 being symmetrically coupled to ground GND) or un-balanced. FIG. 3 shows an antenna/tank circuit comprising an inductive antenna element $L_{ant}$ (e.g. a coil antenna) having resistance $R_{ant}$. The antenna/tank circuit may just as well comprise a capacitive antenna element $C_{ant}$ (e.g. a patch antenna), the tank circuit in that case including inductive resonance elements (e.g. L1, L2, L3).

This highlights the point that the typical antenna itself does not necessarily have a narrow bandwidth, second order behavior, etc. This may only occur, when the antenna is loaded, which also indicates that tuning/calibration of the system (to adapt the specific properties of the antenna to the specifications of the system) is advantageous.

In an embodiment, the communication system is adapted to establish a wireless link between a device comprising a transmitter part and a device comprising a receiver part. In an embodiment the wireless link is uni-directional. In an embodiment, the devices of the communication system can be configured to be both transmitters and receivers (but not at the same time). In an embodiment, the communication system comprises two or more devices each comprising at least a transmitter part and/or a receiver part. In an embodiment, the communication system comprises a listening device, e.g. a hearing instrument. In an embodiment, the communication system comprises an audio gateway for receiving a number of audio signals from a number of audio sources and for transmitting a selected one of the received audio signals to a listening device. In an embodiment, at least one, such as all, of the devices of the communication system is/are portable, body worn devices. In an embodiment, the wireless link is based on a near-field coupling between to adjacent antennas. In an embodiment, the wireless link is based on far-field (radiated) electromagnetic signals.

Figure 4:
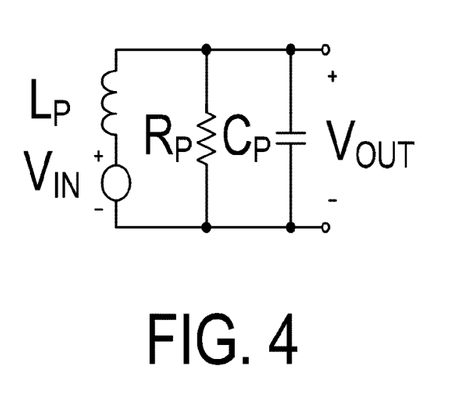
FIG. 4 shows a simplified electric equivalent diagram of an inductive antenna/tank circuit, e.g. the one shown in FIG. 3.

FIG. 4 shows a simplified electric equivalent diagram of an inductive antenna/tank circuit, e.g. the one shown in FIG. 3. The circuit illustrates an embodiment comprising an inductor $L_P$ (representing an electrically small loop antenna) in resonance with on-chip capacitance $C_P$, $R_P$ being the equivalent parallel resistance of the loop antenna. The induced voltage $V_{IN}$ in the loop antenna experiences a passive voltage gain such that the (output, e.g. on-chip) voltage swing $V_{OUT}$ across the capacitor Cp is much larger (a result of an impedance transformation). The output terminals are e.g. connected to a radio part of an integrated circuit for providing processing of the signal (e.g. including equalization according to the present disclosure, and possibly tuning capacitances for the antenna/tank circuit).

The signal bandwidth is e.g. taken to be 5% of the center frequency $f_0$ i.e. located from the (normalized) frequency $\omega=0.975$ to $\omega=1.025$ (with the center frequency normalized to $\omega_0=1$). The signal bandwidth is adapted to be equal to the antenna/tank bandwidth, by setting the Q-factor, $Q=\omega_0/BW_{ant}=1/0.05=20$.

In FIGS. 5a and 5b, the amplitude and phase response of the passive gain, i.e. the transfer function ($V_{out}/V_{in}$), with Q=20 is shown. Also the response with Q=50 is shown to demonstrate the effect of increasing the Q further (i.e. using a smaller antenna/tank $BW_{ant}$ than the signal $BW_{sig}$).

Notice that when the signal bandwidth is equal to the −3 dB bandwidth of the loaded antenna (tank), then there is not only a 3 dB amplitude distortion across the band. There is also a +/−45 degree phase distortion. This is enough to seriously degrade the performance of communication systems using robust modulation forms like BPSK, QPSK or FSK with a low modulation index. The distortion will completely invalidate the link when more advanced modulation forms like 8-PSK or QAM are used.

In the case where both the transmitter and the receiver has an antenna tank circuits like this, the total amplitude distortion is 6 dB and the phase distortion is +/−90 degrees within the band of interest. This amount of distortion invalidates communication using most modulation forms. These concerns highlight why traditional communications systems always use an antenna bandwidth significantly larger than the signal band of interest.

FIGS. 5a and 5b also show that increasing the antenna Q-factor from Q=20 to Q=50 (for the same signal bandwidth) results in much more amplitude distortion (+/−8.5 dB) and phase distortion (+/−68 deg.) for each antenna. Clearly such a system is useless unless some kind of pre-distortion and/or compensation of the distortion is performed as proposed in this application.

Figure 5C:
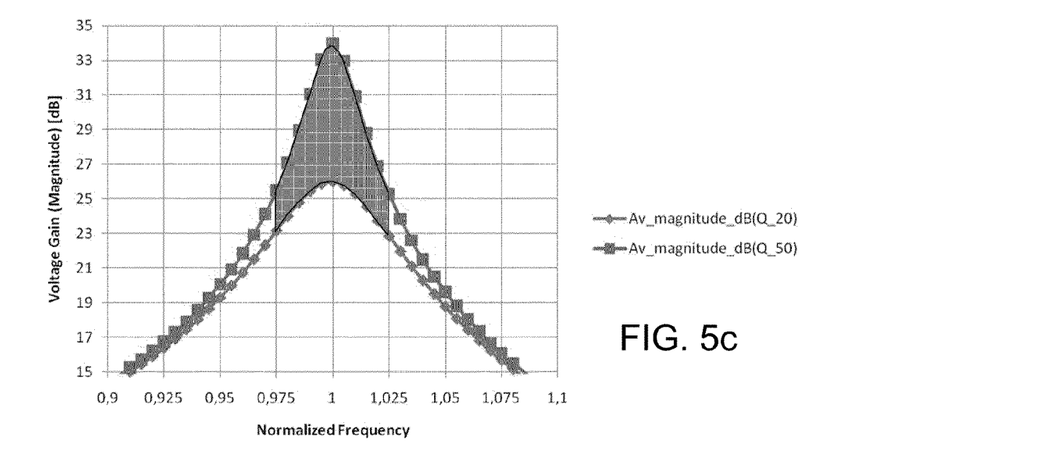

Now also notice that the output voltage with Q=50 is larger than with Q=20 for all frequencies. Actually, the signal is between 2 dB and 8 dB higher in the frequency band of interest (see FIG. 5c). This can e.g. be used to lower the current consumption in the receiver significantly and/or to improve the sensitivity of the communication system (of course under the assumption that the distortion can be handled).

In addition to this, the thermal noise power in the antenna/tank (not shown) is also reduced by a factor of 50/20=2.5 i.e. the sensitivity of the wireless communication system is improved by 10*LOG(2.5)=4 dB (assuming that the noise of the input stage is not dominating).

Another advantage is that ONLY the signal voltage is increased significantly. Undesired interfering signals placed at some distance from the carrier are not magnified so relative to the desired signal they have been attenuated i.e. the effective amount of filtering has been improved.

In other words, by compensating amplitude and phase distortion, a significant benefit of using a high Q-factor in an LC network with an electrically small antenna—also with an antenna/tank bandwidth much smaller than the signal bandwidth—is provided.

Among the benefits can be:
Several dB higher signal voltage at the receiver input=>lower current consumption and/or better sensitivity.
Several dB lower thermal noise from antenna/tank=>better sensitivity.
Better filtering.

Figure 6:
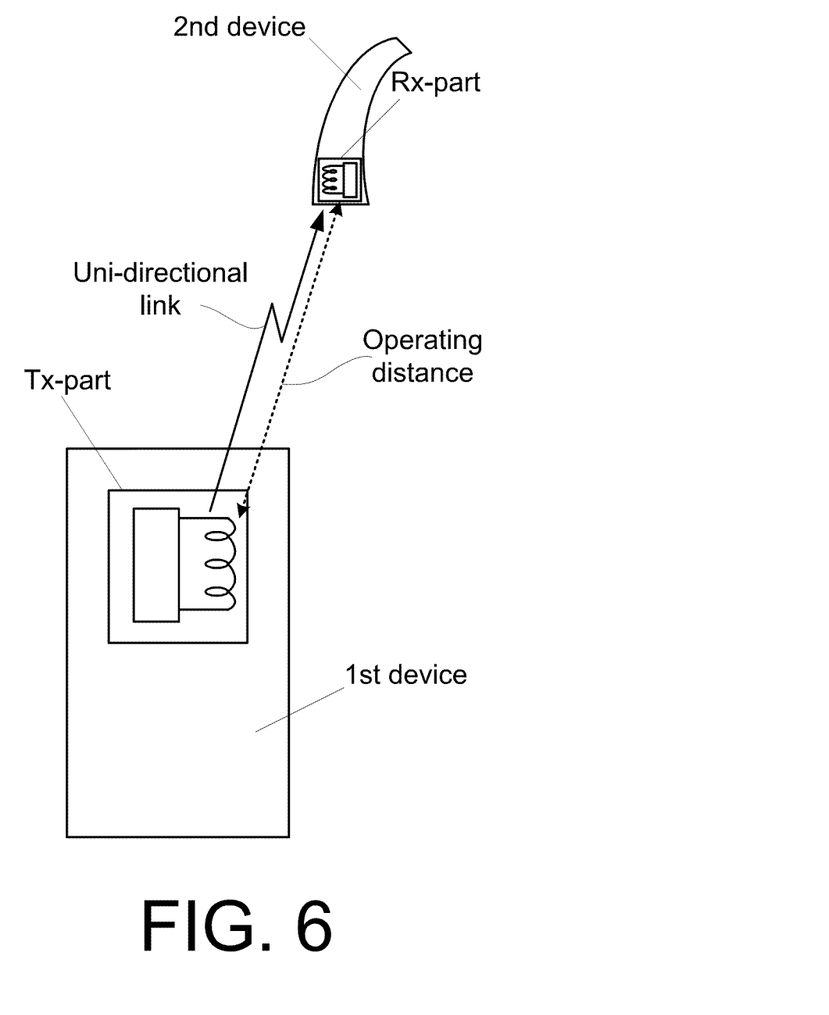
FIG. 6 shows an example of communications system according to the present application.

An example of a wireless communication system according to the present application is shown in FIG. 6. The transmitting device ($1^{st}$ device) comprises transmitter part (Tx-part) comprising frequency transposition, equalization and Tx-antenna circuit (cf. FIG. 1). The receiving device ($2^{nd}$ device), here having the form of a listening device, e.g. a head set or a hearing instrument (here shown as a behind the ear part of a hearing instrument), comprises a receiving part (Rx-part) comprising Rx-antenna, frequency transposition, and equalization circuitry (cf. FIG. 1). The $1^{st}$ and $2^{nd}$ devices both comprise a signal processing unit (SP) adapted for communicating with (or fully or partially form part of) the transmitter and receiver parts of the devices. The signal processing units may fully or partially perform the tasks of frequency transposition and equalization. The signal processing units are preferably adapted to measure the current resonance frequency $f_0$ and bandwidth $BW_{ant}$ of the Tx- and Rx-antenna parts, respectively. The signal processing units (SP) are further, preferably, adapted to be able to modify (calibrate) the transfer function of the equalization filters (FILTER-Tx and FILTER-Rx of FIG. 1) and/or the tuning of the antenna parts (Tx, Rx in FIG. 1) based on the measurements of current resonance frequency $f_0$ and bandwidth $BW_{ant}$ of the Tx- and Rx-antenna parts to dynamically keep the distortions introduced by the narrow band antenna(s) at a minimum. Preferably, the calibration is performed at predefined points in time, e.g. regularly, e.g. at a frequency larger than 0.01 Hz, such as larger than 0.1 Hz, such as larger than 1 Hz. In an embodiment, the calibration frequency is linked to the temperature of the device in question (frequency increasing with increasing temperature). In an embodiment, the signal processing unit form part of an integrated circuit. In an embodiment, the integrated circuit further comprises trimming capacitors for use in calibrating the resonance frequency $f_0$ and bandwidth $BW_{ant}$ of the Tx- and Rx-antenna parts. The $1^{st}$ device can e.g. be a mobile telephone or an intermediate device (e.g. an audio gateway) between a communication device (e.g. a mobile telephone) or an entertainment device and the $2^{nd}$ device. The transmitter and receiver parts are adapted so that an excitation of Tx-antenna coil of the Tx-part with a signal to be transmitted results in a magnetic coupling with antenna coil of the Rx-part, when they are located within a predefined distance of each other (indicated by dashed arrow Operating distance, referring to the linear path distance between the Tx- and Rx-parts) and a corresponding reception of the signal in receiver part.

The wireless link between the $1^{st}$ and $2^{nd}$ device is indicated to be uni-directional, but may just as well be bi-directional (in which case the $1^{st}$ and $2^{nd}$ devices each comprise a transmitter and receiver part). A protocol for a uni-directional inductive link is e.g. described in US 2005/0255843 A1. An example of a system comprising a hearing instrument and an audio selection device is e.g. described in EP 1 460 769 A1. Inductive communication (i.e. communication based on electromagnetic induction as opposed to electromagnetic radiation) between a hearing instrument and a gateway device in accordance with a standard or proprietary protocol is e.g. described in EP 1 480 492 A2. The wireless link may e.g. carry an audio signal (e.g. streaming audio from an entertainment device or a telephone), e.g. in stereo. The bandwidth or bit rate of the signal to be transmitted may be adapted to be in the order of hundreds of kHz (kbit/s) or in the order of MHz (Mbit/s). The range of the link may be adapted to be in the range from a few centimetres to 10s of meters. In a preferred embodiment, the range is adapted to distances occurring for devices to be worn on a persons' body (e.g. less than 2 m such as less than 1 m, such as less than 0.5 m).

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

References
EP 0 261 935 A2 (NORTHERN TELECOM) 30 Mar. 1988
US 2008/158076 A1 (BROADCOM) 3 Jul. 2008
WO 2005/053179 A1 (STARKEY, OTICON) 9 Jun. 2005
EP 1 107 472 A2 (SONY CORPORATION) 13 Jun. 2001
EP 1 777 644 A1 (OTICON) 25 Apr. 2007
US 2005/0110700 A1 (STARKEY LABORATORIES) 26 May 2005
WO 2005/055654 (STARKEY LABORATORIES, OTICON) 16 Jun. 2005
WO 2005/053179 (STARKEY LABORATORIES, OTICON) 9 Jun. 2005
US 2005/0255843 A1 (Hilpisch et al.) 17 Nov. 2005
EP 1 460 769 A1 (PHONAK) 22 Sep. 2004
EP 1 480 492 A2 (SIEMENS AUDIOLOGISCHE TECHNIK) 24 Nov. 2004

The invention claimed is:
1. A wireless communication system comprising
a) a first device comprising a transmitter part comprising a Tx-antenna for transmitting an electrical signal, modulated according to a digital modulation scheme, and having a signal bandwidth $BW_{sig}$ and
b) a second device comprising a receiver part comprising an Rx-antenna for receiving a transmitted electromag- netic signal, at least one of the Tx- and Rx- antennas is a narrowband antenna having an antenna bandwidth $BW_{ant}$, wherein the Tx- and/or Rx-antenna bandwidths fulfil the relation $BW_{ant}=k \cdot BW_{sig}$, wherein the system is adapted to provide that k is smaller than 1.25, and the antenna bandwidth $BW_{ant}$ is defined as the −3dB bandwidth of the loaded antenna when it is connected to the communication system, and the signal bandwidth $BW_{sig}$ is defined as the bandwidth within which 99% of the signal power is located, the wireless communication system further comprising at least one compensation unit electrically connected to the Tx- or to the Rx-antennas, wherein the compensation unit is/are adapted for compensating for the amplitude and/or phase distortion introduced by the narrowband Tx- and/or Rx-antennas.

2. A wireless communication system according to claim 1 wherein the digital modulation scheme comprises digital frequency or phase modulation.

3. A wireless communication system according to claim 1 wherein the transmitter and receiver parts each further comprises a frequency transposition unit electrically connected to the Tx- and Rx-antennas of the transmitter and receiver parts, respectively, the frequency transposition units being adapted for transforming a frequency range of an input signal to another frequency range, and wherein the compensation unit(s) is/are adapted for compensating for the amplitude and/or phase distortion introduced by the Tx- and/or Rx-antennas.

4. A wireless communication system according to claim 1, wherein the compensation unit(s) is/are implemented as first order filter(s) with a real zero located at the same frequency as the real pole of the combined antenna and frequency translating blocks.

5. A wireless communication system according to claim 1 wherein the narrowband antenna(s) can be represented by a second order transfer function and a resonance frequency that is equal to a signal frequency of the transmitted wireless signal.

6. A wireless communication system according to claim 1 wherein k is smaller than or equal to 1.0.

7. A wireless communication system according to claim 6, wherein k is in the range from 0.1 to 1.0.

8. A wireless communication system according to claim 1 wherein the transmitter and receiver parts are adapted to implement a wireless link based on inductive coupling between the transmitting and receiving antennas.

9. A wireless communication system according to claim 1 wherein at least one of the narrow band antenna(s) is an electrically small antenna.

10. A wireless communication system according to claim 1 adapted to provide that the resonance frequency $f_0$ of the Tx- and/or Rx-antennas can be tuned to a desired value within a predefined range of resonance frequencies.

11. A wireless communication system according to claim 10, wherein the transmitter and/or receiver parts comprise(s) a number of trim capacitors for providing said tuning of said resonance frequency.

12. A wireless communication system according to claim 1 comprising two or more devices each comprising at least a transmitter part or a receiver part.

13. A wireless communication system according to claim 1 wherein the first and second devices each comprise a transmitter part as well as a receiver part.

14. A radio frequency receiver part for receiving digitally modulated radio signals within a first frequency band of width $BW_{sig}$ via an antenna and a tuning circuit, the antenna and the tuning circuit together being tuned to a second frequency band of width $BW_{ant}$ overlapping with the first frequency band and fulfilling the relation $BW_{ant} = k \cdot BW_{sig}$, wherein the receiver part being adapted to provide that k is smaller than 1.25, and the antenna bandwidth $BW_{ant}$ is defined as the −3dB bandwidth of the loaded antenna, and the signal bandwidth $BW_{sig}$ is defined as the bandwidth within which 99% of the signal power is located, the receiver part is adapted to compensate within the entire first frequency band for such phase and/or amplitude changes to the received radio signals that are caused by the antenna and the tuning circuit.

15. A radio frequency transmitter part for transmitting digitally modulated radio signals within a first frequency band of width $BW_{sig}$ via an antenna and a tuning circuit, the antenna and the tuning circuit together being tuned to a second frequency band of width $BW_{ant}$ overlapping with the first frequency band and fulfilling the relation $BW_{ant}=k \cdot BW_{sig}$ wherein the transmitter part being adapted to provide that k is smaller than 1.25, and the antenna bandwidth $BW_{ant}$ is defined as the −3dB bandwidth of the loaded antenna, and the signal bandwidth $BW_{sig}$ is defined as the bandwidth within which 99% of the signal power is located, the transmitter part is adapted to pre-compensate within the entire first frequency band for such phase and/or amplitude changes to the transmitted radio signals that are caused by the antenna and the tuning circuit.

16. A radio frequency part according to claim 14 or 15, wherein the part comprises a measurement circuit adapted to measure the resonance frequency and/or the bandwidth of the antenna tuning circuit, and the part is adapted to adjust the compensation and/or the resonance frequency and/or the bandwidth of the antenna tuning circuit in dependence of the measured values.

17. A method of operating a wireless communication system, the system comprising a) a first device comprising a transmitter part comprising a Tx-antenna for transmitting an electrical signal, modulated according to a digital modulation scheme, and having a signal bandwidth $BW_{sig}$;

b) a second device comprising a receiver part comprising an Rx-antenna for receiving a transmitted electromagnetic signal;

the method comprising

A) providing that at least one of the Tx- and Rx- antennas is a narrowband antenna having an antenna bandwidth $BW_{ant}$, wherein the Tx- and/or Rx-antenna bandwidths fulfil the relation $BW_{ant} = k \cdot BW_{sig}$;

B) providing that k is smaller than 1.25, wherein the antenna bandwidth $BW_{ant}$ is defined as the −3dB bandwidth of the loaded antenna when it is connected to the communication system, and the signal bandwidth $BW_{sig}$ is defined as the bandwidth within which 99% of the signal power is located, and C) providing that the transmitted and/or received electromagnetic signal is processed in a way that compensates the amplitude and/or phase distortion of the narrowband antenna(s).

18. A method according to claim 17 comprising
calibrating the narrowband antenna/tank frequency transfer function during operation of the wireless communication system.

19. A method according to claim 17, wherein the Tx- and Rx-antenna frequency transfer functions each are characterized by two parameters 1) the resonance frequency $f_0$ and
2) the quality factor Q, the method comprising a. Providing that the resonance frequency $f_0$ is tuned to a desired value; and b. Providing that the compensation of the amplitude and/or phase distortion of the narrowband antenna(s) is adapted to the quality factor Q of the respective Tx- or Rx-antenna.

20. A method according to claim 19 further comprising
that the Q-value is tuned to an appropriate level, which the wireless communication system is designed to be able to handle to be able to keep the quality of the transmission and reception within specified limits.

21. A method according to claim 19 comprising
providing that the signal processing is adapted to the quality factor Q of the antenna/tank in an automatic routine, e.g. performed during startup of the system, and/or at predefined points in time, and/or on request of a user.

22. A method according to claim 17, wherein
k is in the range from 0.1 to 1.0.

\* \* \* \* \*